(12) United States Patent
Ito et al.

(10) Patent No.: US 6,327,674 B1
(45) Date of Patent: Dec. 4, 2001

(54) DIGITAL INFORMATION RECORDING AND REPRODUCING SYSTEM AND DEFECT MANAGING SYSTEM APPLIED TO THE SAME

(75) Inventors: Seigo Ito, Hanno; Hideyuki Toma, Tokyo, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/206,955

(22) Filed: Dec. 8, 1998

(30) Foreign Application Priority Data

Dec. 9, 1997 (JP) .................................................... 9-338760
Dec. 11, 1997 (JP) .................................................... 9-341385

(51) Int. Cl.[7] ............................ G06F 13/00; G06F 11/00; G11B 7/00; H04L 1/22
(52) U.S. Cl. ................................... 714/8; 714/7; 711/203
(58) Field of Search .................................. 714/5, 7, 8, 42; 711/100, 203, 206; 365/185.09, 185.11; 360/31, 48, 53; 369/32, 47, 58

(56) References Cited

U.S. PATENT DOCUMENTS

| | | | |
|---|---|---|---|
| 4,498,146 | * | 2/1985 | Martinez . |
| 5,233,591 | * | 8/1993 | Nishihara . |
| 5,319,627 | * | 6/1994 | Shinno et al. . |
| 5,541,903 | * | 7/1996 | Funahashi et al. . |
| 6,182,240 | * | 1/2001 | Mine . |

* cited by examiner

Primary Examiner—Gopal C. Ray
(74) Attorney, Agent, or Firm—Finnegan, Henderson, Farabow, Garrett & Dunner, L.L.P (57) ABSTRACT

A recording and reproducing system has a computer data table and an audio visual data table as address conversion tables for managing addresses necessary for a process in response to an access command for record or reproduction transmitted from a host system to a recording medium. When a defective block occurs, in case of computer data, a substitute block is used and the physical address of the defective block in the computer data table is rewritten to the physical address of the substitute block. In case of audio visual data, the data is written in the defective block and the physical address of the defective block in the audio visual data table is maintained. In response to an access command from the host system, the recording and reproducing system executes an access process to the recording medium with reference to the computer data table or the audio visual data table, in accordance with the kind of data to be accessed.

21 Claims, 7 Drawing Sheets

FIG. 1

CP DATA TABLE

| LOGICAL BLOCK NUMBER | PHYSICAL BLOCK NUMBER |
|---|---|
| 0 | 100 |
| 1 | 101 |
| 2 | 102 |
| 3 | 103 |
| ⋮ | ⋮ |

12a

AV DATA TABLE

| LOGICAL BLOCK NUMBER | PHYSICAL BLOCK NUMBER |
|---|---|
| 10 | 200 |
| 11 | 201 |
| 12 | 202 |
| 13 | 203 |
| ⋮ | ⋮ |

AV DATA TABLE

| LOGICAL BLOCK NUMBER | PHYSICAL BLOCK NUMBER |
|---|---|
| 0 | 100 |
| 1 | 101 |
| 2 | 102 |
| ⋮ | ⋮ |
| 6 | 103 |
| 7 | 104 |

12b

CP DATA TABLE

| LOGICAL BLOCK NUMBER | PHYSICAL BLOCK NUMBER |
|---|---|
| ⋮ | ⋮ |
| 3 | 200 |
| 4 | 201 |
| 5 | 202 |
| ⋮ | ⋮ |

12a

CURRENT TABLE

| | LOGICAL BLOCK NUMBER | PHYSICAL BLOCK NUMBER |
|---|---|---|
| AV DATA | 0 | 100 |
| | 1 | 101 |
| | 2 | 102 |
| CP DATA | 3 | 200 |
| | 4 | 201 |
| | 5 | 202 |
| AV DATA | 6 | 103 |
| | 7 | 104 |
| | ⋮ | ⋮ |

DIGITAL INFORMATION RECORDING AND REPRODUCING SYSTEM AND DEFECT MANAGING SYSTEM APPLIED TO THE SAME

BACKGROUND OF THE INVENTION

The present invention relates to a recording and reproducing system for recording digital data including audio visual data, such as digital image data and sound data, and computer data, in a disk storage medium, and reproducing digital information from the disk storage medium, and also to a data recording and reproducing method applied to the system.

This application is based on Japanese Patent Applications No. P09-338760 filed on Dec. 9, 1997 and No. P09-341385 filed on Dec. 11, 1997, the contents of which are incorporated herein by reference.

In recent years, recording and reproducing systems have been developed, which record and reproduce "multimedia data", such as digital image data (including static image) and sound data. In particular, a DVD drive, using a DVD (Digital Versatile Disk) as a storage medium, has attracted public attention. The DVD drives include DVD-ROM drives, only for use in reproduction, and DVD-RAM drives for use in both record and reproduction. Stream data consisting of serial data, including image data and sound data, is hereinafter referred to as AV (Audio Visual) data.

A DVD-RAM drive has functions of not only reproducing AV data stored in a DVD but also recording AV data transmitted from a digital broadcast station or data output from a personal computer. For this reason, the DVD-RAM drive is particularly known as an external storage device of a personal computer, as well as a video player or video deck for reproducing AV data on the screen of a television receiver. Moreover, the DVD-RAM drive is expected to be used in future as a memory medium incorporated in a set top box or IRD (Integrated Receiver Decoder), which has a receiver including, for example, a digital satellite broadcasting antenna and having a function of displaying received digital AV data on a television receiver or a display of a personal computer.

The disk storage medium used in such a DVD-RAM drive requires high reliability, particularly when it is used as an external storage medium of a personal computer. This is because, if data write error or data read error occurs in the disk storage medium, the computer may not normally operate. To improve the reliability of the disk storage medium, a defect managing system is employed, in which a spare area is prepared in advance in the disk storage medium, and if a defect area where data write error occurs exists, data is written in the spare area.

In this defect managing system, an address of a physical block corresponding to a defective block is changed to the address of a substitute block in an address conversion table representing the relationship between a logical block, i.e., an access unit (a management unit in the host system) and a physical block (a physical storage area on the disk storage medium).

When a controller (CPU) of the DVD-RAM drive accesses a logical block access-requested by the host system, it obtains a physical block corresponding to the logical block by means of the address conversion table, so that data can be recorded or reproduced. If the physical block is a defective block, the address of a substitute block to be substituted for the defective block is registered. Therefore, if the CPU is to access data stored in the defective block, it accesses the substitute block.

Data treated by a personal computer (hereinafter referred to as CP data) can be treated in units of logical block. If a defect occurs in a block, the drive actually accesses a substitute block. Although the access operation is not continuous for this reason, this does not cause a significant problem. However, in a recording and reproducing system for recording and reproducing AV data, AV data must be treated as serial data (stream data). In the conventional defect managing system, a substitute block is used in the case where a defect occurs in a block. Therefore, when AV data is serially reproduced, data (not necessarily formed in units of stream) which should have been recorded in a defective block is read and reproduced from the substitute block. For this reason, in the process of reproducing AV data, when the object of the access operation is changed from continues physical blocks to the substitute block, it is highly possible that the reproduction of AV data is temporarily interrupted. In other words, in a recording and reproducing system which treats a plurality of kinds of data, such as CP data and AV data consisting of serial data, if the conventional defect managing system is simply applied, problems may arise particularly in the data reproduction process.

Further, when a read error in a reading process or a write error in a write process occurs in a physical block to be accessed, it is not necessarily be caused by a defect in the physical block itself on a disk storage but may result from dust adhered on the medium. In particular, in case of a DVD-RAM drive, since the DVD is an exchangeable disk storage medium which is not fixed in the drive, unnecessary substance such as dust may be easily adhered to the disk storage medium by insertion/removal of the medium in/from the drive. In case where the write error or read error is caused by unnecessary substance, e.g., dust, a normal writing or reading process can be executed if the unnecessary substance is removed. Thus, such an error is not a nonrecoverable error. The unnecessary. substance, e.g., dust, adhered on the disk storage medium is often removed naturally from the disk storage medium by repeated data recording and reproducing operation of the drive. However, according to the conventional defect managing system, even if the physical block itself is not a defective block, if a write error occurs, the physical block is unusable and a substitute block in the spare area is used instead. Therefore, a great deal of the spare area is used, and a normal physical block, which is not defective, is liable to be wasted. In case of a read error, since a retry process is generally executed a plurality of times, there is high possibility of the unnecessary substance such as dust being removed at that process.

BRIEF SUMMARY OF THE INVENTION

A first object of the present invention is to provide a recording and reproducing system for recording/reproducing computer data and AV data in/from a disk storage medium, which assures high reliability of data processing and realizes a defect managing function to allow a normal data reproducing process, in case a defective area occurs in the disk storage medium.

A second object of the present invention is to provide a recording and reproducing system, wherein if a write error occurs in a data writing process, a physical block is used, until the physical block is determined to be a defective block based on a predetermined condition, so that the spare area is saved and a wasteful use of a physical block is prevented, thereby improving the storage capacity of the disk storage medium.

The first object of the present invention is achieved by the following recording and reproducing system. In the recording and reproducing system, AV data which is serial data or CP data which can be dealt with in units of logical block is recorded in a disk storage medium. Data is recorded and reproduced in units of physical block corresponding to a logical block which is a unit of access from a host system. In case of CP data, the recording and reproducing system executes conversion between a logical address designating a logical block and a physical address designating the physical block by means of CP data converting means, and records/reproduces the data in/from a predetermined physical block of the disk storage medium. In case of AV data, the recording and reproducing system executes conversion between a logical address designating the logical block and a physical address designating the physical block by means of AV converting means, and records/reproduce the data in/from a predetermined physical block of the disk storage medium.

In case of writing CP data, if a physical block in which the data is to be written is a defective block, a substitute block is obtained and the data is written therein, and the physical address designating the defective physical block of the CP data converting means is rewritten to the physical address designating the substitute block. On the other hand, in case of writing AV data, if a physical block in which the data is to be written is a defective block, a defect managing process is performed, in which the data is written in the defective block and the physical address designating the defective physical block registered in the AV data converting means is maintained.

The recording and reproducing system as described above selects address converting means in accordance with the kind of data to be recorded on the disk storage medium, and executes a recording or reproducing process. More specifically, when a defect occurs in a physical block, in case of CP data, the CP converting means is used to apply the conventional defect managing system for writing data in a substitute block. In case of AV data, the AV converting means is used to apply a different system from the conventional defect managing system, so that a defect managing function adapted for the reproduction property of serial data can be realized. In this system, even if the physical block in which data is to be written is a defective block, the writing process for writing data in the defective block is continued without using a substitute block. For this reason, when the system reproduces AV data, the data recorded in the defective block is not reproduced completely; however, the reproduction of data is not interrupted, unlike in case a substitute block is accessed. Thus, CP data can be subjected to the defect management, in which the reliability of data is regarded as important, while AV data can be subjected to the reproduction process in which the continuity of data is regarded as important.

It is possible that the system has a defect table for recording a physical address of a defective physical block, so that different managing processes can be performed with respect to CP data and AV data, if the physical data in which data is to be written is a defective block. In case of CP data, data is written in a substitute block and the physical address designating the defective block is registered in the defect table. In case of AV data, the defective block is skipped and the data is written in another physical block, and the physical address designating the skipped physical block is registered in the defect table.

Thus, the host system can recognize what physical block is a defective block and replaced by a substitute block, or skipped and not used, by referring to the defect table. When AV data is reproduced, since a defective block is skipped, the recorded data can be reproduced completely.

The second object of the present invention is achieved by the following recording and reproducing system. The recording and reproducing system comprises writing converting means for executing conversion between a logical address and a physical address when data is recorded, reading converting means for executing conversion between a logical address and a physical address when data is reproduced, and control means for executing a data writing process and a data reading process.

The control means, in accordance with an access command from the host system, write data in a physical block obtained by means of the writing converting means, when the access command is a data recording command. When the access command is a data reproducing command, the control means read data from a physical block obtained by means of the reading converting means. A defect processing means write data in a substitute block substituted for a physical block in which a write error has occurred in the data writing process, and register the physical address of the substitute block as a physical address in the reading converting means. The process of writing data in the physical block is continuously tried, until the physical block in which the error has occurred is determined to be a defective block.

With this system, since the writing converting means is used in the data writing process whereas the reading converting means is used in the data reading process, it is possible to execute a defect managing process in each process. More specifically, if a write error occurs in the data writing process, data is provisionally written in a substitute block and the physical address of the substitute block is registered in the reading converting means. As a result, in the data reproducing process, the control means execute a process of reading data from the substitute block registered in the reading converting means. Therefore, it is highly possible that the recorded data is normally reproduced.

On the other hand, the physical block in which the write error has occurred is maintained as it is. The defect processing means monitor, for example, the number of write errors, and do not unconditionally determine the physical block in which the write error has occurred as a defective block, but determine it as a defective block when the number of errors reaches a reference value. In other words, even if a write error occurs in a physical block, the process of writing data in the physical block is continued, until the block is determined to be a defective block by a predetermined condition, such as the number of errors. If the error results from dust or the like adhered to the disk, the dust may probably removed by repeating the writing process. Thus, the cause of the write error, such as dust, can be removed during the writing process, and a physical block which is not a defective block can be prevented from being wasted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described below with reference to the accompanying drawings.

1. First Embodiment

System Configuration

Figure 1:
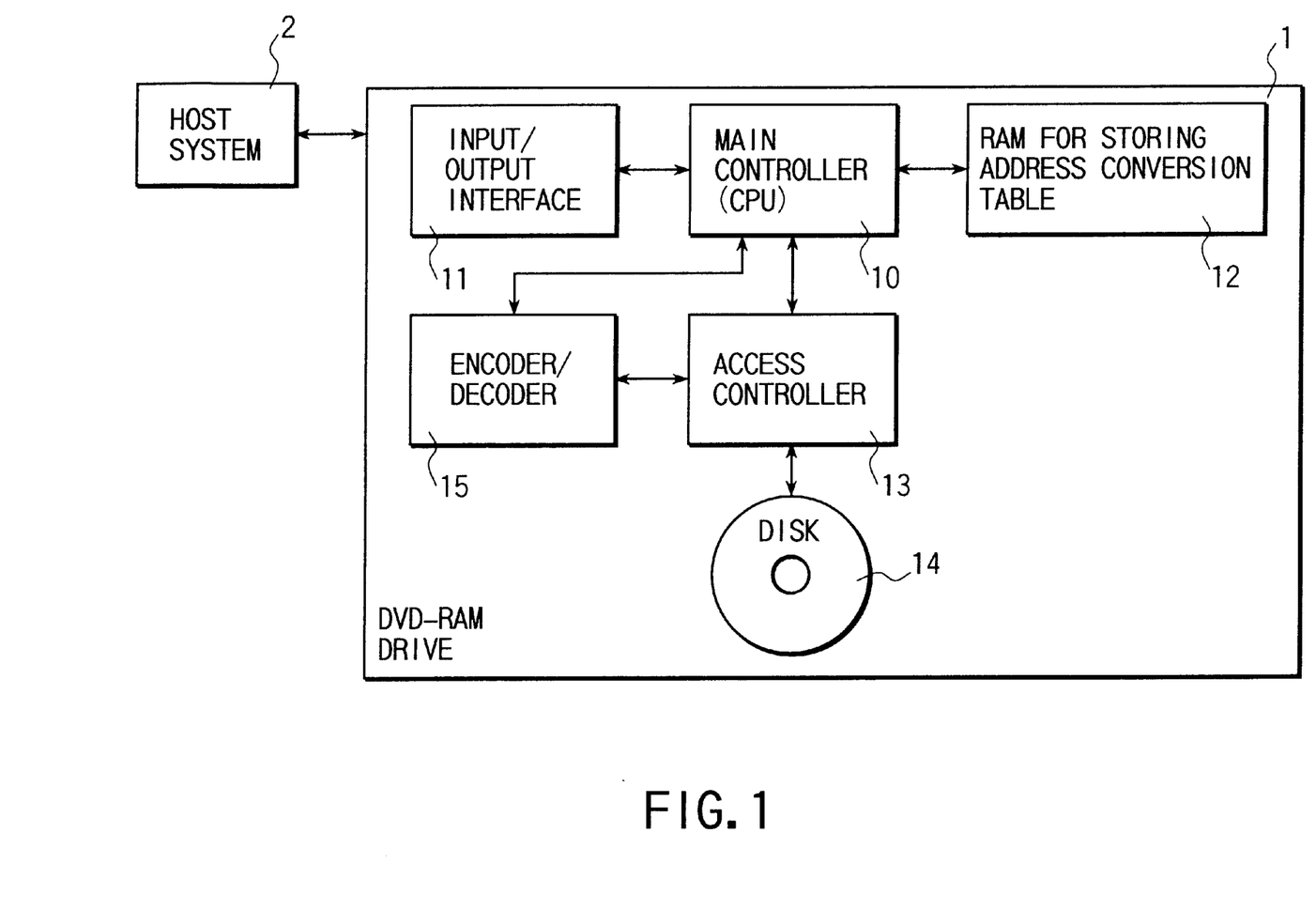
FIG. 1 is a block diagram showing the configuration of a recording and reproducing system according to a first embodiment of the present invention.

FIG. 1 is a block diagram showing the configuration of a recording and reproducing system according to a first embodiment of the present invention. As shown in FIG. 1, the system of the present invention comprises a DVD-RAM drive 1 and a host system 2. The host system 2 is intended to be a personal computer. The host system 2 has a function for reproducing digital AV data and normal CP data read from the DVD-RAM drive 1 and displaying the reproduced data on a display. It also has an input device, for example, a keyboard or a mouse, for inputting commands necessary for recording and reproducing operations of the DVD-RAM drive 1. As described before, AV data means data including stream data consisting of serial data, such as image data and sound data, and containing various control information necessary for reproduction control. AV data of stream data may be either image data or sound data.

The DVD-RAM drive 1 mainly comprises a main controller 10, an input/output interface 11, a RAM 12 for storing address conversion tables, an access controller 13, a disk (DVD) 14 and an encoder/decoder 15. The input/output interface 11 controls input and output of AV data, CP data and various commands between the DVD-RAM drive 1 and the host system 2. The main controller 10 is a microprocessor (hereinafter referred to as CPU). The main controller 10 controls the access controller 13, so that recording/reproducing control and defect managing processes according to this embodiment can be executed.

The address conversion tables are tables for managing addresses used in accessing the disk 14 to execute data recording and reproducing. It is stored in a predetermined area of the disk 14. The CPU 10 loads the address conversion tables read from the disk 14 in the RAM 12 and uses them. The address conversion tables of this embodiment include, as will be described later, a CP data table 12a for managing addresses of the CP data and an AV data table 12b for managing addresses of the AV data (shown in FIG. 2).

The disk 14 is a DVD adapted to recording and reproducing serial data (stream information) such as AV data, and CP data which can be dealt with in a unit of a logical block.

The access controller 13 performs operations of recording/reproducing data in/from the disk 14. The encoder/decoder 15 performs a moving picture encoding operation and a moving picture decoding operation in, for example, MPEG (Moving Picture Coding Experts Group) 2 system.

Configuration of Address Conversion Tables

Figure 2:
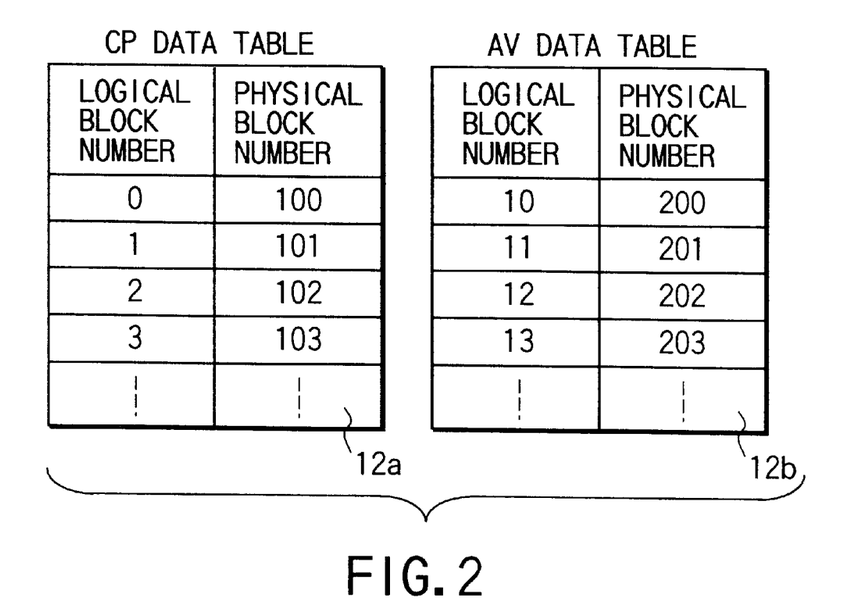
FIG. 2 is a diagram for explaining address conversion tables of the first embodiment.

As shown in FIG. 2, the address conversion tables include the CP data table 12a for managing addresses of the CP data and the AV data table 12b for managing addresses of the AV data. Each of the tables 12a and 12b shows the relationship between a logical block number (logical address) managed by the host system 2 and a physical block number (physical address) indicating a physical storage area on the disk 14.

Figure 3:
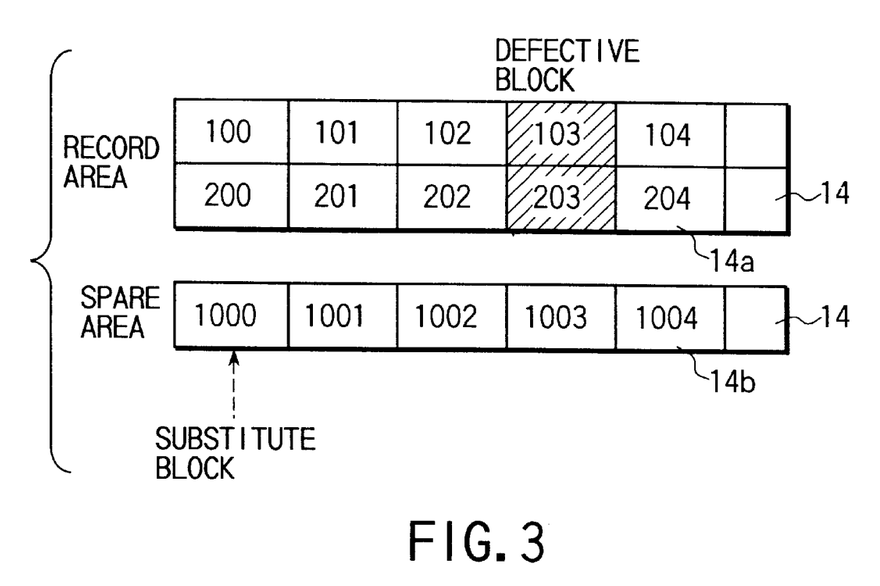
FIG. 3 is a diagram for explaining a defect managing process of the first embodiment.

As shown in FIG. 3, a storage area 14a on the disk 14 is divided into a number of physical blocks (corresponding to sectors of access units), each of which is assigned a physical block number (100–104, 200–204). In the CP data table 12a, the physical block numbers (100–103) are assigned to the logical block numbers (0–3). In the AV data table 12b, the physical block numbers (200–203) are assigned to the logical block number (10–13). Further, according to this embodiment, the disk 14 has a spare area 14b, in a different memory area from the record area 14a. The record area and the spare area may not clearly be two separated. That is, for example, the spare area may be interspersed in the record area. The spare area 14b is an area for providing a substitute block (spare block) for substituting a defective block. Physical block numbers (1000–1004) are assigned for each substitute block.

Defect Managing Process of This Embodiment

A defect managing process of this embodiment will be described with reference to the flowchart of FIG. 4 in view of FIGS. 1 to 3.

Basically, the CPU 10 of the DVD-RAM drive 1 controls the access controller 13 to record/reproduce AV data or CP data in/from the disk 14 in accordance with an access command transmitted from the host system 2 through the input/output interface 11. For example, when an access command to reproduce AV data is transmitted from the host system 2 to the DVD-RAM drive 1, the CPU 10 reads recorded AV data from the disk 14 and transmits it to the host system 2 through the input/output interface 11. Based on the data, the host system 2 executes a reproducing process for displaying the AV data on the screen of the display device.

Figure 4:
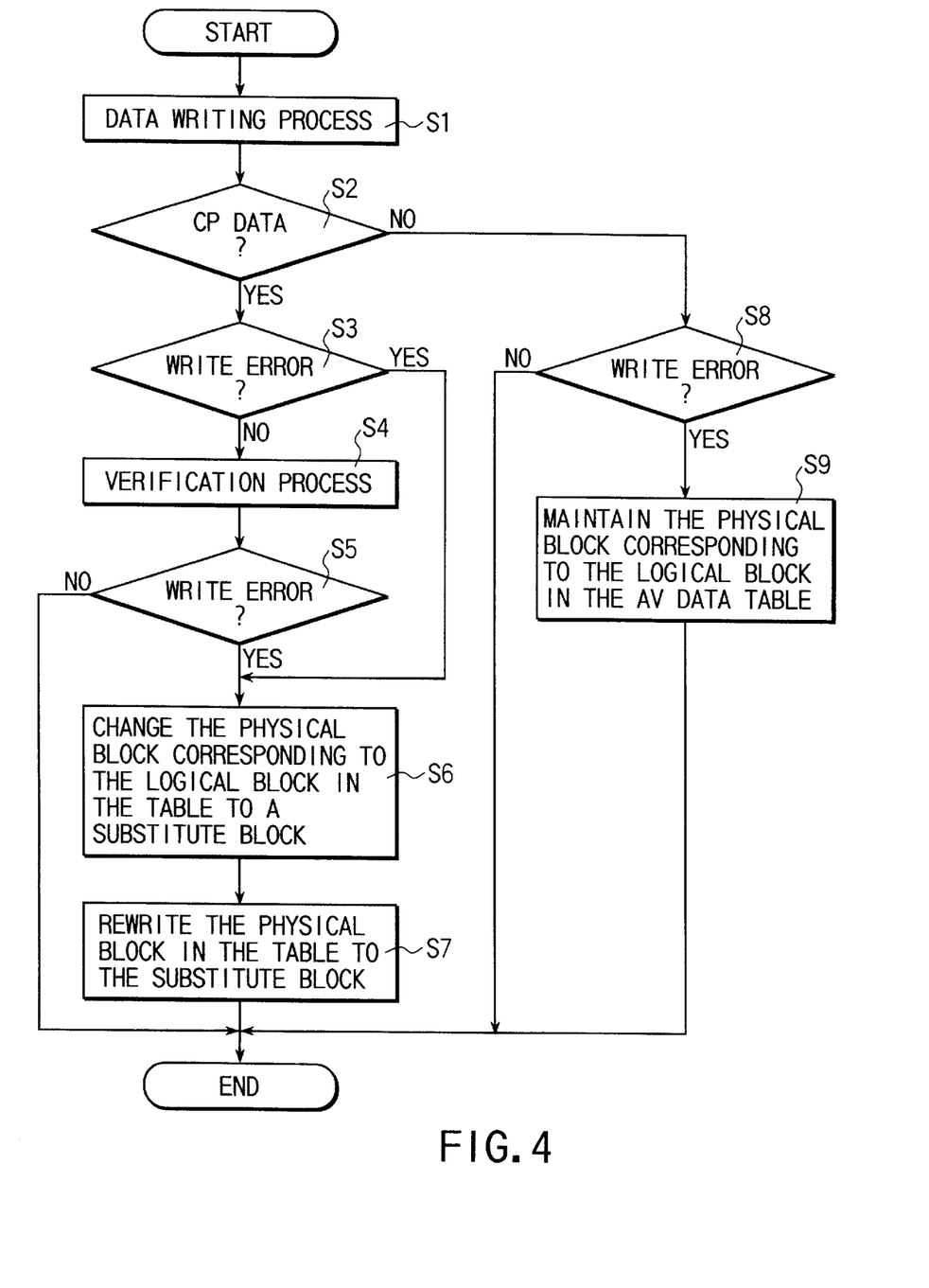
FIG. 4 is a flowchart showing procedures of a defect managing process of the first embodiment.

When a command to record CP data is transmitted from the host system 2, the CPU 10 executes a writing process to write CP data transmitted from the host system 2 on the disk 14 in Step S1 shown in FIG. 4. The command from the host system 2 includes a logical address, i.e., a logical block number. The CPU 10 designates a free physical block on the disk 14 with reference to the CP data table 12a, and executes control for writing the CP data to be recorded in the physical block. At this time, the CPU 10 registers the logical block number and the corresponding physical block number on the CP data table 12a. For example, the logical block number 0 and the physical block number 100 are registered.

After completion of the write process, in Step S2, the CPU 10 determines whether the data is CP data or AV data. In this case, since the data is CP data, the CPU 10 determines "Yes" in Step S2. If a write error occurs, the CPU 10 determines "Yes" in Step S3. Then the process of Step 6 is executed. A write error in Step S3 means an address error (ID error) of a physical block where data is written, i.e., state in which the physical block can not be recognized. In Step S4, a verification process to determine whether the recorded data is normal or not is executed. If a write error does not occur (the recorded data is normal) in the verification process, the CPU 10 determines "No" in Step S5, and the command process for recording the CP data from the host system 2 is ended.

A case where a write error occurs in the verification process, that is, the CPU 10 determines "Yes" in Step S5, will now be described. In this embodiment, it is assumed as shown in FIG. 3 that the CPU 10 executes an operation for writing the CP data in the physical block number 103 in the record area 14a on the disk 14 in accordance with a write command from the host system 2. In this case, the logical block number 3 and its corresponding physical block number 103 are registered in the CP data table 12a.

If a write error occurs, the CPU 10 determines that the physical block 103, in which the data to be written, is a defective block, and executes a defect managing process. In this embodiment, if the data to be written is CP data, the CPU 10 sets a substitute block in the spare area 14b as a block to be substituted for the defective block in Step S6. In this embodiment, a substitute block 1000 is set.

Then, the CPU 10 executes a writing process again to write the CP data to be accessed in the set substitute block 1000. In Step S7, the CPU 10 rewrites the physical block number corresponding to the logical block number 3, in the CP data table 12a, to the physical block number 1000 of the substitute block.

As described above, in the CP data recording operation, if the physical block in which data to be recorded is a defective block, the CPU 10 uses a substitute block in the spare area and writes the CP data to be recorded in the substitute block.

When the host system 2 issues an access command to reproduce CP data of the logical block number 3, the CPU 10 refers to the CP data table 12a and recognizes the substitute block of the physical block number 1000 as a physical block corresponding to the logical block number 3. Therefore, the CPU 10 reads the CP data from the substitute block 1000 and transmits it to the host system 2.

On the other hand, when the host system 2 transmits a command to store AV data, the CPU 10 executes a writing process to write the AV data transmitted from the host system 2 on the disk 14. Since the data to be written is AV data, the CPU 10 refers to the AV data table 12. The CPU 10 designates a free physical block on the disk 14 and executes control for writing the AV data to be recorded in the physical block. At this time, the CPU 10 registers the logical block number and the corresponding physical block number on the AV data table 12b. For example, the logical block number 10 and the physical block number 200 are registered.

After completion of the writing process, in Step S2, the CPU 10 determines whether the data to be written is CP data or not. In this case, since the data is AV data, the CPU determines "No" in Step S2. If it is determined that a write error does not occur, i.e., the physical block where data to be written can not be recognized, the CPU determines "No" in Step S8, and the command process for writing the AV data from the host system 2 is ended. In this case, the logical block number 10 and the corresponding physical block number 200 are registered in the AV data table 12b.

A case where a write error occurs, that is, the CPU determines "Yes" in Step S8, will now be described. In this embodiment, it is assumed that the CPU 10 executes an operation for writing the AV data in the physical block number 203 in the record area 14b on the disk 14, as shown in FIG. 3, in accordance with the write command from the host system 2. In this case, the logical block number 13 and the corresponding physical block number 203 are maintained in the AV data table 12b.

If it is determined that a write error occurs, the CPU 10 determines that the physical block 203, in which the data to be written, is a defective block, as described before. In this embodiment, if the data to be written is AV data, the CPU 10 executes a process of writing data in the defective block and does not execute a defect managing process for setting a substitute block in the spare area. In other words, in Step S9, the CPU 10 maintains the defective block 203 as the physical block corresponding to the logical block 13.

As described above, in the operation of recording AV data, even if the physical block in which data is to be written is a defective block, the CPU 10 does not use a substitute block and maintains the defective block as a physical block in which data to be written. However, even in the case of writing data in the defective block, a substitute block may be obtained and the physical address of the physical block corresponding to the logical block in the AV data table 12b may be changed to the physical address of the obtained substitute block.

When an access command to reproduce AV data is transmitted from the host system 2, the CPU 10 refers to the AV data table 12b. For example, a series of physical blocks 200 to 203 corresponding to the logical blocks 10 to 13 are accessed. Then, the CPU 10 reads stream information, serial data, from the physical blocks 200 to 203 and transmits it to the host system 2. Unlike CP data, AV data is not reproduced in units of physical block, but AV data of a plurality of physical blocks are continuously reproduced. At this time, the physical block 203, i.e., the defective block, of the serial stream information is also accessed. Since there is a write error in the defective block 203, AV data is not correctly recorded. Therefore, data cannot be reproduced normally, for example, part of the reproduced image may be disturbed.

As described above, according to this embodiment, if the physical block in which data is to be recorded is a defective block and data to be written in the block is CP data, a defect managing process using a substitute block in the spare area is executed by the verification process in the data writing operation. Thus, CP data, which is probably accessed in units of physical block, can be recorded in normal physical blocks including a substitute block. As a result, it is possible to use a disk storage medium in which high reliability for the performance of recording/reproducing CP data is assured, resulting in high reliability for the host system 2.

On the other hand, when data to be written is AV data, a defective block is used without executing a defect managing process in which a substitute block is used. Therefore, in the case of reproducing AV data which is serial data, since a series of physical blocks including a defective block are accessed, there is no interruption of the reproducing operation, which may occur when a substitute block in place of a defective block is accessed. As a result, in the host system 2, a reproduced image is not interrupted, while serial stream information is being reproduced on the screen of the display. It is highly possible that AV data recorded in the defective block is not normally reproduced; however, since the period in which the data is not normally reproduced is very short, the image on the screen is disturbed a little.

First Modification of First Embodiment

Figure 5:
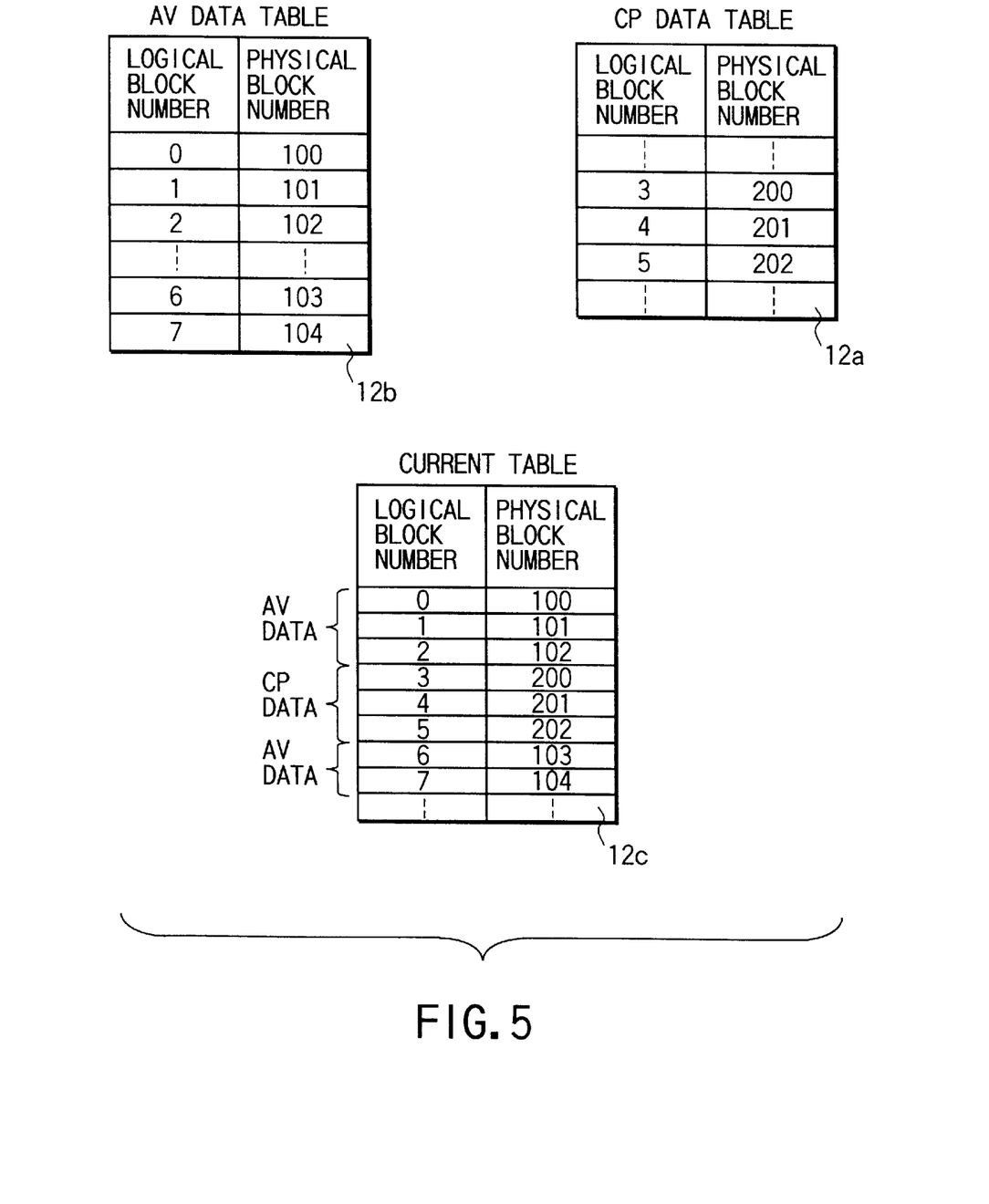
FIG. 5 is a diagram for explaining a first modification of the first embodiment.

FIG. 5 shows a first modification of the above embodiment. The address conversion tables of this modification include a current table 12c in addition to the CP data table 12a and AV data table 12b of the above embodiment. The current table 12c, as shown in FIG. 5, is a table for setting logical block numbers and physical block numbers in the order of access command. According to the above embodiment, since addresses are managed by the CP data table 12a or the AV data table 12b in accordance with the kinds of data, if the CPU 10 does not detect the kind of data at the time of the access command, it cannot refer to an address conversion table.

The current table 12c is provided to solve this problem. In this modification, the CPU 10 can manage addresses on the disk 14 at the current time by referring to the current table 12c at the time of the access command.

Second Modification of First Embodiment

Figure 6:
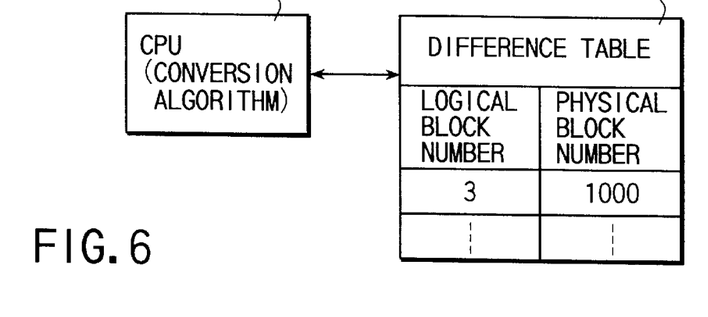
FIG. 6 is a diagram for explaining a second modification of the first embodiment.

FIG. 6 shows a second modification of the above embodiment. The system of the embodiment has the CP data table 12a and the AV data table 12b as address conversion means, and execute a process for converting a logical address to a physical address by using information registered in the tables 12a and 12b. In contrast, according to the second modification, the CPU 10 performs a process of converting a logical address to a physical address by means of a prestored conversion algorithm (program). However, as described above, if a write error occurs and it is necessary to set a substitute block instead of the defective block, the CPU 10 refers to a difference table 12d and uses a physical block number of a substitute block registered in the difference table 12d.

More specifically, as shown in FIG. 6, in a normal access, the CPU 10 converts a logical block number to a physical block number by executing the prestored conversion algorithm (program). It is assumed that the CPU 10 executes a process for writing CP data in the physical block 103 of the record area 14a on the disk 14 corresponding to the logical block number 3. In this case, if a verification process is executed and it is determined that a write error occurs, the CPU 10 set a substitute block of the physical block number 1000 in the spare area 14b in place of the defective block.

In the second modification, the difference table may be replaced by a defect table. In this case, if data to be written is CP data, logical block numbers and physical block numbers of the corresponding substitute blocks are registered in the defect table in the same manner as in the difference table. On the other hand, if data to be written is AV data, since the data is written in a defective block without using a substitute block, the physical block number of the defective block is registered in the defect table. Thus, in the case of AV data, the host system 2 can recognize what physical block is a defective block since the physical block number of the defective block is registered.

In an AV data recording operation, if the physical block in which data is to be written is a defective block, the defective block may be skipped, i.e., data may not be written in the defective block and can be written in the next (or another) physical block. In this case, the CPU 10 registers the physical block number of the skipped defective block in the defect table. Thus, the host system 2 can recognize what physical block is a defective block and skipped. With this system in which a defective block is not used but skipped and data is written in the next physical block, AV data is recorded correctly, since a defective block is not used. For this reason, a reproducing operation is not interrupted, and disturbance of an image does not occur while data is reproduced.

As described above, in the recording and reproducing system for recording and reproducing a plurality of kinds of data, such as AV data and CP data, it is possible to realize a defect managing function adapted for the access properties of AV data, i.e., serial data (stream information) and CP data, respectively. Thus, when a defective block occurs in a disk storage medium, high reliability is assured in recording and reproducing of CP data and the serially reproducing property is maintained in the process of reproducing AV data. Therefore, if the present invention is applied to a system which deals with multimedia information, an efficient defect managing function can be realized.

2. Second Embodiment

System Configuration

The system configuration of the second embodiment is the same as that of the first embodiment.

Configuration of Address Conversion Tables

Figure 7:
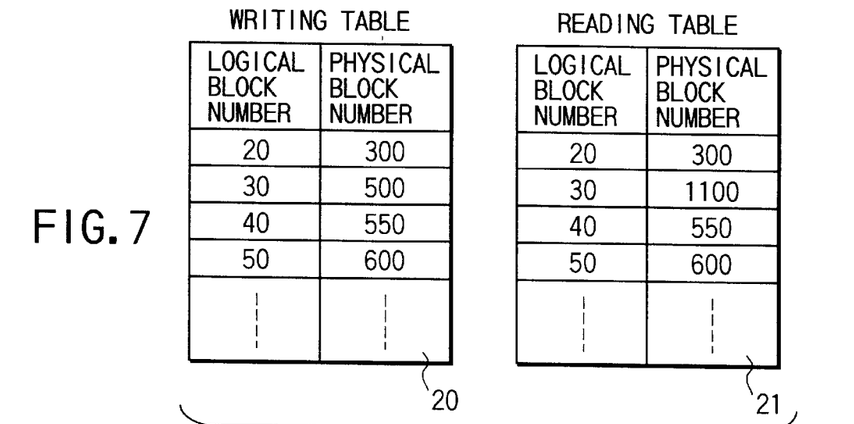
FIG. 7 is a diagram for explaining address conversion tables of a second embodiment of the present invention.

As shown in FIG. 7, the address conversion tables include a writing table 20 used in the data writing process and a reading table 21 used in the data reading process. Each of the tables 20 and 21 shows the relationship between a logical block number managed by the host system 2 and a physical block number indicating a physical storage area on the disk 14. The logical blocks and the physical blocks do not necessarily have one-to-one correspondence, but one logical block may correspond to several physical blocks. In this embodiment, it is assumed that the logical blocks and the physical blocks have one-to-one correspondence for convenience of explanation.

Figure 8:
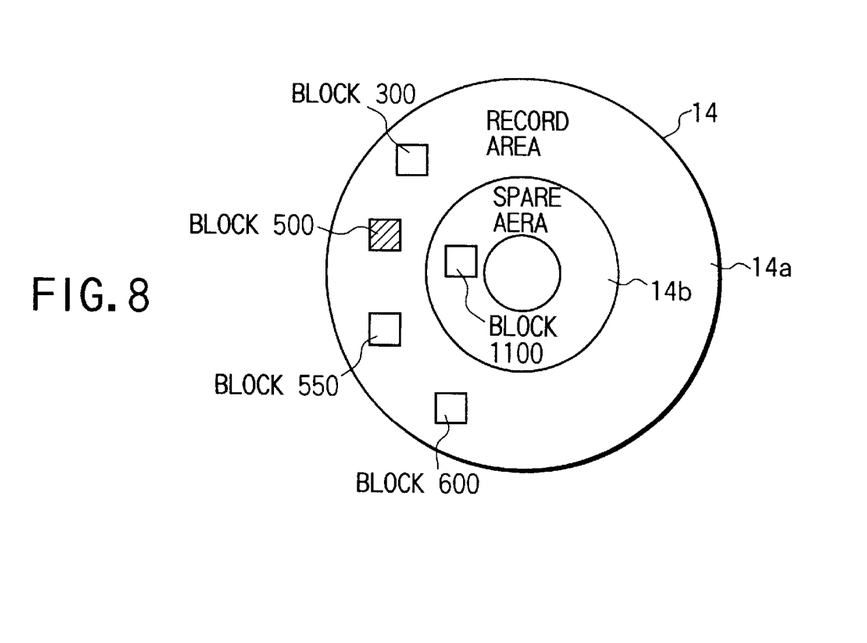
FIG. 8 is a diagram for explaining the configuration of a disk of the second embodiment.

As shown in FIG. 8, the recording surface of the disk 14 has a spare area 14b consisting of substitute blocks necessary for defect management in addition to a record area 14a consisting of a number of physical blocks for storing data. Although the record area and the spare area are clearly separated though adjoining bodies in FIG. 8, but, for example, the former can be interspersed in the latter on the disk 14.

Defect Managing Process of This Embodiment

A defect managing process of this embodiment will be described with reference to the flowcharts of FIGS. 9 and 10 in view of FIGS. 1, 7 and 8.

Figure 9:
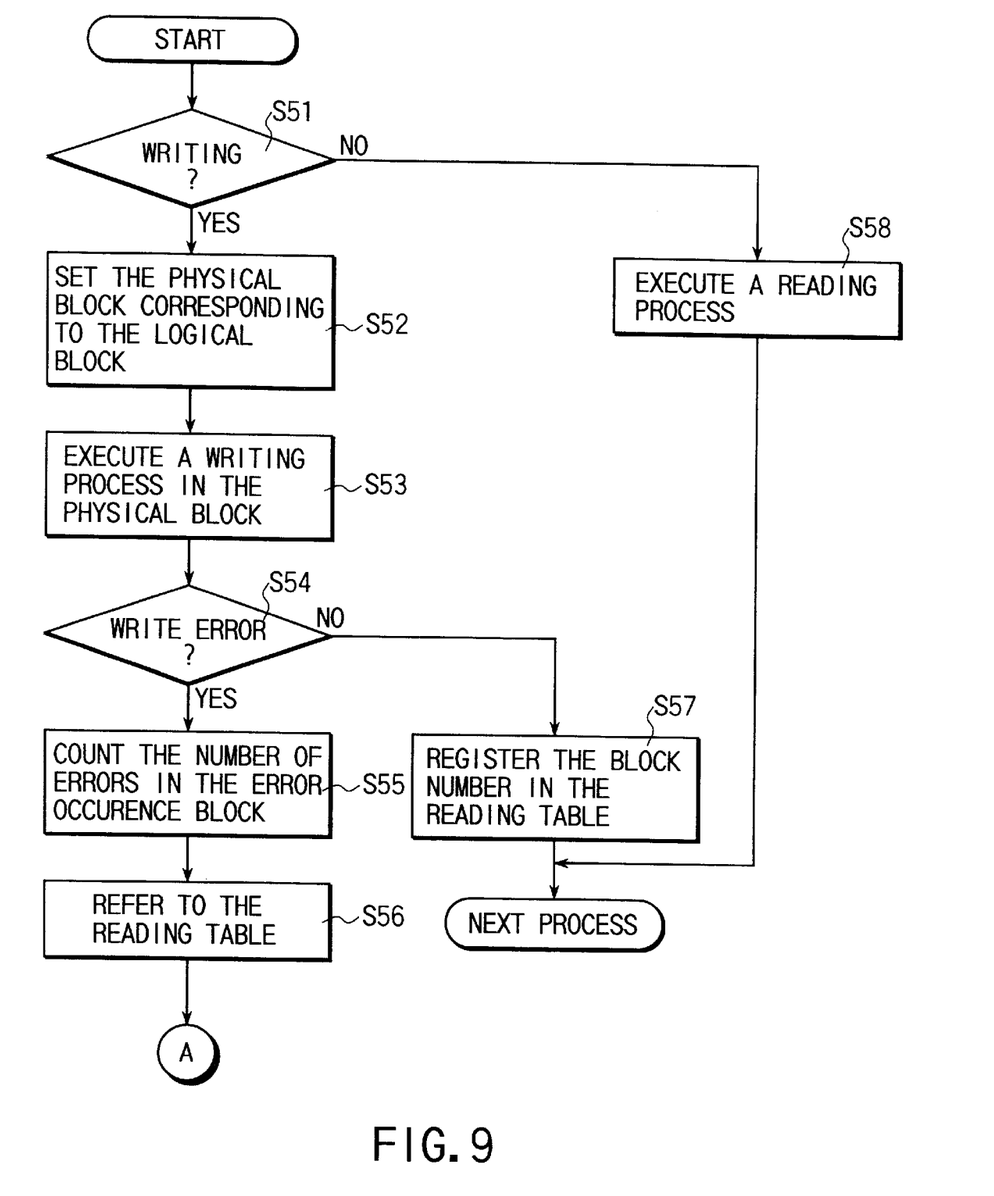
FIGS. 9 and 10 are flowcharts showing procedures of a defect managing process of the second embodiment.
Figure 10:
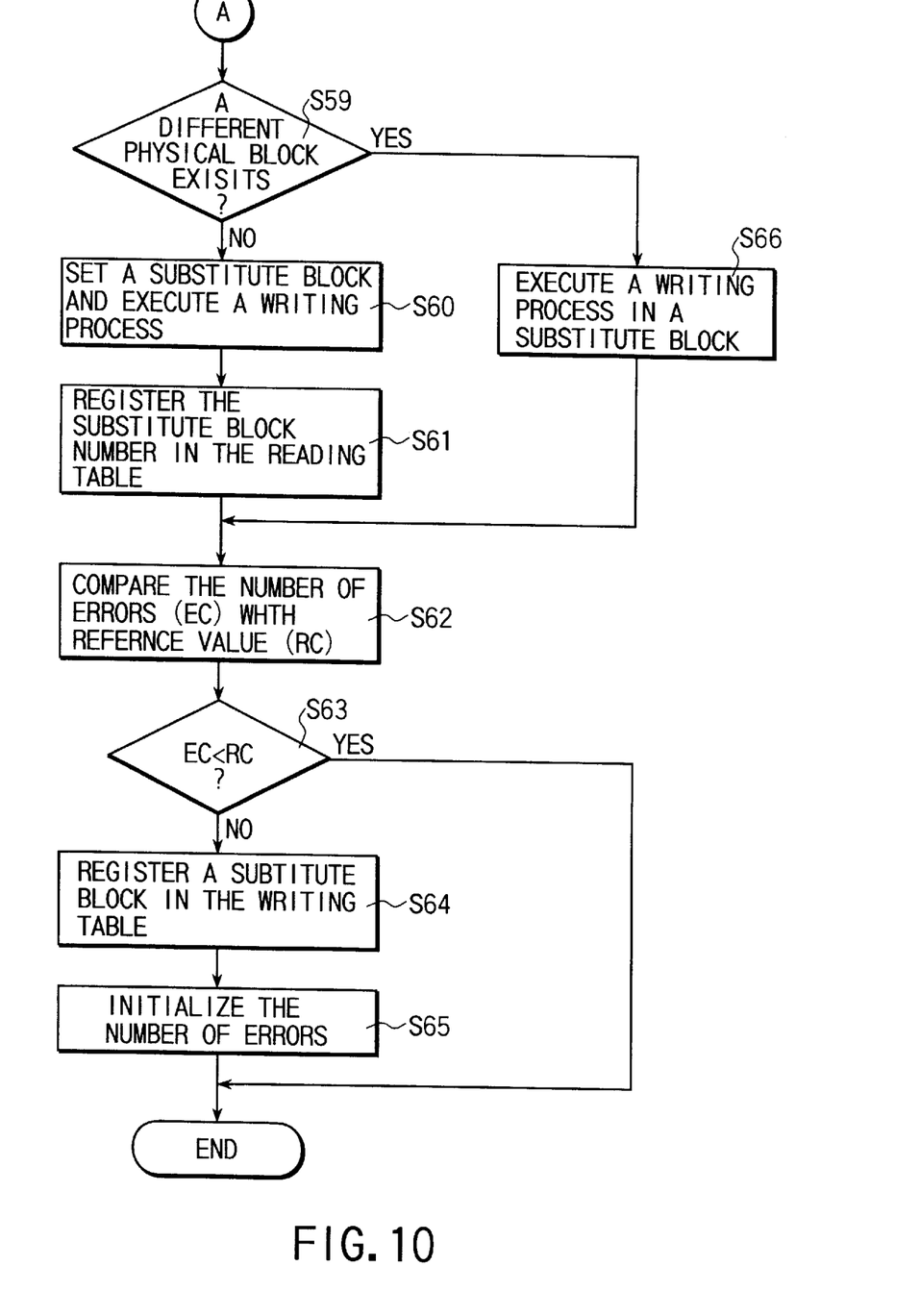

First, when an access command to write data is transmitted from the host system 2 to the DVD-RAM drive 1, the CPU 10 determines "Yes" in Step S51 shown in FIG. 9. In step S52, the CPU 10 sets a physical block corresponding to a logical block with reference to the writing table 20. The physical block is selected from the unused physical blocks, other than the physical blocks which have stored data. In Step S53, the CPU 10 executes a process for writing data in the set physical block. For example, the physical block of the physical block number 300 is set corresponding to the logical block number 20 and data is written in the set block.

The CPU 10 determines, through the normal verification process, whether an error occurs in the writing process. If a write error does not occur in the data writing process, the CPU 10 determines "No" in Step S54. In step S57, the CPU 10 registers the physical block number 300 corresponding to the logical block number 20 in the reading table 21.

When an access command to read data is transmitted from the host system 2 to the DVD-RAM drive 1, the CPU 10 determines "No" in Step S51 shown in FIG. 9. In Step S58, the CPU 10 reads the recorded data from the disk 14 and transmits it to the host system 2 through the input/output interface 11. At this time, the CPU 10 refers to the reading table 21 shown in FIG. 7, determines the physical block number corresponding to the logical block number transmitted from the host system 2, and reads data from the physical block. For example, as shown in FIG. 8, data is read from the physical block of the physical block number 300 corresponding to the logical block of the logical block number 20.

If a write error occurs in the data writing process, the CPU 10 determines "Yes" in Step S54, sets the physical block as an error occurrence block, and starts a defect managing process. In this example, the CPU 10 sets the physical block of the physical block number 500 corresponding to the logical block of the logical block number 30, and executes a data writing process.

As the defect managing process, in Step S55, the CPU 10 starts counting the number of errors in the error occurrence block, i.e., the physical block 500. The CPU 10 refers to the reading table 21 in Step S56. In Step S59 shown in FIG. 10, the CPU 10 determines whether a physical block different from the physical block 500 in which the error occurs has been registered as a physical block to be accessed, corresponding to the logical block 30, serving as a substitute block.

If a physical block number different from the physical block 500, i.e., the error occurrence block, has not been recorded in the reading table 21, corresponding to the logical block number 30, the CPU 10 determines "No" in Step S59. Then, in Step S60, the CPU 10 sets a substitute block 1100 in the spare area 14*b*, as shown in FIG. 8, and executes a data writing process. In Step S61, the substitute block number 1100 is registered corresponding to the logical block number 30 in the reading table 21, as shown in FIG. 7, to reflect the result of data writing. Accordingly, in a process of reproducing data of the logical block number 30, the CPU 10 reads recorded data from the substitute block 1100 registered in the reading table 21.

If a substitute block different from the physical block 500, i.e., the error occurrence block, has been recorded in the reading table 21 corresponding to the logical block 30, the CPU 10 determines "Yes" in Step S59. In Step S66, the CPU 10 executes a writing process in the substitute block. This is a case where the substitute block has been set for the logical block number 30.

In this embodiment, a physical block in which a write error occurs is provisionally set as an error occurrence block and a substitute block is registered in the reading table 21. However, in the writing table 20, a substitute block 1100 corresponding to the logical block 30 is not registered at this time. In other words, the CPU 10 does not determine that the physical block 500 in which the write error occurs is a defective block but maintains it as it is.

Then, the CPU 10 starts a process for determining whether the error occurrence block should be determined to be a defective block or not based on a predetermined condition. More specifically, the CPU 10 executes a process for comparing the number of errors (EC) in the error occurrence block, i.e., the physical block number 500, with a reference value (RC). The aforementioned predetermined condition is as follows.

The process for writing data in the physical block (error occurrence block), in which an error has occurred in the previous write process, is continued, and if the number of write errors reaches the reference value (RC), the block is determined to be a defective block, and if a normal writing process can be made by the time the number of write errors reaches the reference value (RC), the block is excluded from the error occurrence blocks.

Based on the result of comparing the number of errors (EC) with the reference value (RC), if the number of errors (EC) is smaller than the reference value (RC), the CPU 10 determines "Yes" in Step S63 and the physical block 500 is maintained as an error occurrence block. On the other hand, based on the result of comparison, if the number of errors (EC) reaches the reference value (RC), the CPU 10 determines "No" in Step S63. Then, the CPU 10 determines the physical block 500, in which the error has occurred, to be a defective block. In this case, in Step S64, the CPU 10 registers a substitute block in the writing table 20. In Step S65, the number of errors (EC) is initialized and the next writing or reading process is started.

Further, when the process of writing data in the error occurrence block is executed again, if a write error does not occur, the block is naturally excluded from the error occurrence blocks. In Step S57, the CPU 10 registers the physical block excluded from the error occurrence blocks in the writing table 20 and the reading table 21 corresponding to the respective logical block.

As described above, according to this embodiment, the defect managing process in each process can be performed using the writing table 20 in the data writing process or the reading table 21 in the data reading process. In particular, if a write error occurs in the data writing process, the physical block is not immediately determined to be a defective block but provisionally determined to be an error occurrence block and the writing process is continued. If the number of write errors (EC) reaches the predetermined reference value (RC), the CPU 10 determines the physical block to be a defective block and excludes it from the physical blocks in which data to be written. In other words, even if a write error occurs in a physical block, the CPU 10 does not immediately determine the physical block to be a defective block and continues the data writing process. Thus, until the physical block is determined to be a defective block based on the aforementioned condition, the CPU 10 treats the block as an error occurrence block and continues the writing process, while confirming the number of write errors in the block.

When a write error occurs in a physical block, if the physical block has not been determined to be a defective block, a writing process for writing data in a substitute block is executed and the number of the substitute block is registered in the reading table 21. As a result, in the data reproducing process, data can be read from the normal substitute block based on the physical block number obtained from the reading table 21. Thus, the reliability of data can be secured.

On the other hand, if the write error results from unnecessary substance such as dust, not a defect of the physical block, the dust or the like may probably removed by repeating the writing process. Therefore, if the cause of the error of a physical block is removed during the writing process, the physical block is maintained as a normal physical block. In other words, until the block is determined to be a defective block, it is regarded as an error occurrence block and data can be written therein. If the block is determined to be a defective block, it is excluded from the blocks in which data to be written. Therefore, since it is highly possible that the error occurrence block is recovered to a normal physical block, the system of the present invention can maintain the available physical blocks (record area) efficiently as compared to the conventional defect managing system. Further, since a substitute block is not used unconditionally when a write error occurs, the number of used substitute blocks can be suppressed. Furthermore, when a substitute block is provisionally used, and if the error occurrence block is thereafter recovered to a normal physical block, the substitute block can be reused as a substitute block for another physical block.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording and reproducing system, wherein audio visual data which is serial data or computer data which can be dealt with in units of logical block is recorded in a disk storage medium, and data is recorded and reproduced in units of physical block corresponding to a logical block which is a unit of access from a host system, said system comprising:

computer data converting means for executing conversion between a logical address designating the logical block and a physical address designating the physical block, when computer data is recorded in or reproduced from the disk storage medium;

audio visual data converting means for executing conversion between a logical address designating the logical block and a physical address designating the physical block, when audio visual data is recorded in or reproduced from the disk storage medium; and control means, in accordance with an access command from the host system, for executing recording and reproducing of data with respect to a predetermined physical block of the disk storage medium, with reference to the computer data converting means in a case where computer data is to be accessed, and with reference to the audio visual data converting means in a case where audio visual data is to be accessed.

2. The recording and reproducing system according to claim 1, wherein a spare area including a substitute block to be substituted for a defective physical block is prepared in advance on the disk storage medium, said recording and reproducing system further comprising defect processing means for, in accordance with an access command from the host system, in a case of writing computer data, if a physical block in which the computer data is to be written is a defective physical block, writing the computer data to the substitute block and rewriting a physical address designating the defective physical block registered in the computer data converting means to a physical address designating the substitute block, and in a case of writing audio visual data, even if a physical block in which the audio visual data is to be written is a defective physical block, writing the audio visual data to the defective physical block and maintaining a physical address designating the defective physical block registered in the audio visual data converting means.

3. The recording and reproducing system according to claim 2, wherein, when data is read from a physical block to be accessed with reference to the audio visual data converting means in response to an access command from the host system to reproduce audio visual data, the control means continues to reproduce data, even if the physical block is a defective block.

4. The recording and reproducing system according to claim 1, wherein a spare area including a substitute block to be substituted for a defective physical block is prepared in advance on the disk storage medium, said recording and reproducing system further comprising defect processing means for, in accordance with an access command from the host system, if computer data is to be written and a physical block in which the computer data is to be written is a defective physical block, obtaining the substitute block, writing the computer data to the substitute block and rewriting a physical address designating the defective physical block registered in the computer data converting means to a physical address designating the substitute block, and if audio visual data is to be written and a physical block in which the audio visual data is to be written is a defective physical block, writing the audio visual data to the defective physical block, obtaining the substitute block and registering a physical address designating the substitute block in the audio visual data converting means.

5. The recording and reproducing system according to claim 1, wherein, when data is read from a physical block to be accessed with reference to the audio visual data converting means in response to an access command from the host system to reproduce audio visual data, the control means continues to reproduce data, even if the physical block is a defective block.

6. A recording and reproducing system, wherein audio visual data which is serial data or computer data which can be dealt with in units of logical block are recorded in a disk storage medium, and data is recorded and reproduced in units of physical block corresponding to a logical block which is a unit of access from a host system, said system comprising:

computer data converting means for executing conversion between a logical address designating the logical block and a physical address designating the physical block, when computer data is recorded in or reproduced from the disk storage medium;

audio visual data converting means for executing conversion between a logical address designating the logical block and a physical address designating the physical block, when audio visual data is recorded in or reproduced from the disk storage medium;

registering means, in accordance with an access command from the host system, for registering a physical address corresponding to a logical address to be accessed in the computer data converting means when computer data is written in the disk storage medium, and in the audio visual data converting means when audio visual data is written in the disk storage medium; and defect processing means for, in the case of writing computer data, if a physical block in which the computer data is to be written is a defective physical block, obtaining a substitute block prepared in advance from the disk storage medium, writing the computer data to the substitute block, and rewriting a physical address designating the defective physical block registered in the computer data converting means to a physical address designating the substitute block, and in the case of writing audio visual data, even if a physical block in which the audio visual data is to be written is a defective physical block, writing the audio visual data in the defective physical block without using the substitute block and maintaining a physical address designating the defective physical block registered in the audio visual data converting means.

7. The recording and reproducing system according to claim 6, further comprising reproduction processing means in accordance with an access command from the host system to reproduce data for, in case of reproducing computer data, reading data from a physical block or a substitute block to be accessed with reference to the computer data converting means, and in case of reproducing audio visual data, reading data from a physical block to be accessed with reference to the audio visual data converting means and continuing a reproduction process even if the physical block to be accessed is a defective block.

8. A defect managing method applied to a recording and reproducing system, wherein audio visual data which is serial data or computer data which can be dealt with in units of logical block is recorded in a disk storage medium, and data is recorded and reproduced in units of physical block corresponding to a logical block which is a unit of access from a host system, said method comprising:

a computer data converting step of executing conversion between a logical address designating the logical block and a physical address designating the physical block, when computer data is recorded in or reproduced from the disk storage medium;

an audio visual data converting step of executing conversion between a logical address designating the logical block and a physical address designating the physical block, when audio visual data is recorded in or reproduced from the disk storage medium;

a determining step of determining whether a physical block in which data is to be written is a defective block, when the computer data or the audio visual data is to be written;

a step of, if it is determined in the determining step that the physical block in which data is to be written is a defective block, in case of writing computer data, obtaining a substitute block prepared in advance from the disk storage medium, writing the computer data in the substitute block, and changing a physical address designating the defective physical block registered in the computer data converting step to a physical address designating the substitute block; and a step of, if it is determined in the determining step that the physical block in which data is to be written is a defective block, in case of writing audio visual data, writing the audio visual data in the defective physical block without using the substitute block and maintaining a physical address designating the defective physical block registered in the audio visual data converting means.

9. A recording and reproducing system, wherein audio visual data which is serial data or computer data which can be dealt with in units of logical block is recorded in a disk storage medium, and data is recorded and reproduced in units of physical block corresponding to a logical block which is a unit of access from a host system, said system comprising:

computer data converting means for executing conversion between a logical address designating the logical block and a physical address designating the physical block, when computer data is recorded in or reproduced from the disk storage medium;

audio visual data converting means for executing conversion between a logical address designating the logical block and a physical address designating the physical block, when audio visual data is recorded in or reproduced from the disk storage medium;

current converting means, in accordance with an access command from the host system to record data, for registering a relationship between a physical address designating a physical block storing data and a corresponding logical address in order of access command, without distinction of the computer data and the audio visual data; and control means, in accordance with an access command from the host system, for executing recording and reproducing data in or from a predetermined physical block of the disk storage medium, with reference to the current converting means and one of the computer data converting means and the audio visual data converting means.

10. The recording and reproducing system according to claim 9, wherein the control means refer to the current converting means, and determine, based on a logical address accompanying the access command from the host system, whether data recorded in the physical block corresponding to the logical block is computer data or audio visual data.

11. A recording and reproducing system, wherein audio visual data which is serial data or computer data which can be dealt with in units of logical block are recorded in a disk storage medium, and data is recorded and reproduced in units of physical block corresponding to a logical block which is a unit of access from a host system, said system comprising:

a defect table in which a physical address of a defective physical block on the disk memory medium is recorded;

computer data writing means for, in case of writing computer data, if a physical block in which the computer data is to be written is a defective physical block, obtaining a substitute block prepared in advance from the disk storage medium, writing the computer data to the substitute block, and registering a physical address designating the defective physical block in the defect table; and audio visual data writing means for, when audio visual data is to be written, if a physical block in which data is to be written is a defective block, skipping the defective block, writing the audio visual data in another physical block and registering a physical address designating the skipped defective block in the defect table.

12. The recording and reproducing system according to claim 11, wherein, when the physical block in which data is to be written is a defective block, the computer data writing means register in the defect table a physical address of the substitute block as well as the physical address designating the defective block.

13. A data recording and reproducing system, wherein digital data is recorded in a disk storage medium and data is recorded and reproduced in units of physical block corresponding to a logical block which is a unit of access from a host system, said system comprising:

writing converting means for executing conversion between a logical address designating the logical block and a physical address designating the physical block, when data is recorded in the disk storage medium;

reading converting means for executing conversion between a logical address designating the logical block and a physical address designating the physical block, when data is reproduced from the disk storage medium; and control means, in accordance with an access command from the host system, for writing data in a physical block obtained by means of the writing converting means, when the access command is a data recording command, and reading data from a physical block obtained by means of the reading converting means, when the access command is a data reproducing command.

14. A data recording and reproducing system, wherein digital data is recorded in a disk storage medium, data is recorded and reproduced in units of physical block corresponding to a logical block which is a unit of access from a host system, and a substitute block to be substituted for a defective physical block is prepared in advance on the disk storage medium, said system comprising:

writing converting means for executing conversion between a logical address designating the logical block and a physical address designating the physical block, when data is recorded in the disk storage medium;

reading converting means for executing conversion between a logical address designating the logical block and a physical address designating the physical block, when data is reproduced from the disk storage medium;

control means, in accordance with an access command from the host system, for writing data in a physical block obtained by means of the writing converting means, when the access command is a data recording command, and reading data from a physical block obtained by means of the reading converting means, when the access command is a data reproducing command; and defect processing means for, when a write error occurs in a process of writing data, writing the data in the substitute block substituted for a physical block in which the write error occurs, registering a physical address of the substitute block as a physical address in the reading converting means, and continuously trying the process of writing data in the physical block, until the physical block in which the error has occurred is determined to be a defective block.

15. The recording and reproducing system according to claim 14, wherein the defect processing means count a number of write errors when the process of writing data in the physical block in which the write error has occurred is continuously tried, and when the number of write errors reaches a preset reference value, the physical block is determined to be a defective block.

16. The recording and reproducing system according to claim 14, wherein when the write error occurs, the defect processing means compare a physical address corresponding to the logical address registered in the reading converting means with a physical address of the physical block in which the write error has occurred, and if the two physical addresses are different, the physical block designated by the physical address registered in the reading conversion means is used as a substitute block.

17. The recording and reproducing system according to claim 16, wherein if the two physical addresses are the same, the defect processing means obtain a substitute block, write the data in the substitute block, and register the physical address of the substitute block as a physical address corresponding to the logical address registered in the reading converting means.

18. The recording and reproducing system according to claim 17, wherein when the process of writing data in the physical block in which the write error has occurred is continuously tried, the defect processing means count a number of write errors, and when the number of write errors reaches a preset reference value, the defect processing means determine the physical block to be a defective block and register the physical address registered in the reading converting means as a physical address corresponding to the logical address registered in the writing converting means.

19. A defect managing method applied to a data recording and reproducing system, wherein digital data is recorded in a disk storage medium, data is recorded and reproduced in units of physical block corresponding to a logical block which is a unit of access from a host system, and a substitute block to be substituted for a defective physical block is prepared in advance on the disk storage medium, said method comprising:

writing converting step for making correspondence between a logical address designating the logical block and a physical address designating the physical block, when data is recorded in the disk storage medium;

reading converting step for making correspondence between a logical address designating the logical block and a physical address designating the physical block, when data is reproduced from the disk storage medium;

a step for, in response to an access command from the host system, writing data in a physical block obtained by the writing converting step, when the access command is a data recording command, and reading data from a physical block obtained by the reading converting step, when the access command is a data reproducing command;

a step for, when a write error occurs in a process of writing data, obtaining the substitute block, writing the data in the substitute block substituted for a physical block in which the write error has occurred, and changing a physical address of the physical block in which the write error has occurred in the correspondence between the logical address and the physical address in the reading converting step to a physical address of the substitute block; and a step for continuously trying the process of writing data in the physical block in which the write error has occurred, until the physical block in which the error has occurred is determined to be a defective block.

20. The defect managing method according to claim 19, further comprising the steps of:

counting a number of write errors, when the process of writing data in the physical block in which the write error has occurred is continuously tried; and determining the physical block to be a defective block, when the number of write errors reaches a preset reference value.

21. The defect managing method according to claim 19, further comprising the steps of:

comparing, when the write error occurs in a process of writing data, a physical address corresponding to the logical address registered in the reading converting step with a physical address of the physical block in which the write error occurs, if the two physical addresses are different, writing the data in the physical block designated by the physical address registered in the reading conversion step, and if the two physical addresses are the same, obtaining a substitute block, and writing the data in the substitute block; and a step of changing the physical address in the correspondence between the logical address and the physical address in the reading converting step to the physical address of the substitute block, when the data is written in the substitute block.

* * * * *